United States Patent [19]

Reinfelder et al.

[11] Patent Number: 5,755,558
[45] Date of Patent: May 26, 1998

[54] FIBER REINFORCED COMPOSITE SPAR FOR A ROTARY WING AIRCRAFT AND METHOD OF MANUFACTURE THEREOF

[75] Inventors: William C. Reinfelder, Woodbridge; Corey D. Jones, Prospect; William Degnan; David A. Kovalsky, both of Shelton; Jeffry C. Purse, Branford, all of Conn.

[73] Assignee: Sikorsky Aircraft Corporation, Stratford, Conn.

[21] Appl. No.: 416,740

[22] PCT Filed: Aug. 31, 1994

[86] PCT No.: PCT/US94/09967

§ 371 Date: Aug. 31, 1994

§ 102(e) Date: Aug. 31, 1994

[87] PCT Pub. No.: WO96/06776

PCT Pub. Date: Mar. 7, 1996

[51] Int. Cl.$^6$ .................................. F04D 29/38
[52] U.S. Cl. ............... 416/230; 416/229 R; 29/889.7
[58] Field of Search .................. 416/223 R, 226, 416/227 R, 229 R, 230, 232; 29/889.7, 889.71, 889.72

[56] References Cited

U.S. PATENT DOCUMENTS

| | | | |
|---|---|---|---|
| 3,490,983 | 1/1970 | Lee . | |
| 3,754,840 | 8/1973 | Zincone | 416/226 |
| 3,782,856 | 1/1974 | Salkind et al. | 416/226 |
| 4,247,258 | 1/1981 | Griffee et al. | 416/230 |
| 4,529,139 | 7/1985 | Smith et al. | 242/7.02 |
| 4,621,980 | 11/1986 | Reavely et al. | 416/226 |
| 4,657,615 | 4/1987 | Braun et al. | 156/245 |
| 4,728,263 | 3/1988 | Basso | 416/226 |
| 4,976,587 | 12/1990 | Johnston et al. | 416/230 |
| 5,087,187 | 2/1992 | Simkulak et al. | 425/112 |

FOREIGN PATENT DOCUMENTS

| | | |
|---|---|---|
| 2234130 | 1/1975 | France . |
| 2040790 | 9/1980 | United Kingdom . |
| 2148821 | 6/1985 | United Kingdom . |

*Primary Examiner*—John T. Kwon
*Attorney, Agent, or Firm*—Brian A. Collins

[57] ABSTRACT

A composite spar for a helicopter rotor blade includes upper and lower side-wall regions and forward and aft conic regions wherein the conic regions further define transition and closure subregions. Constant width crossplies and unidirectional plies are stacked and arranged to form crossply and unidirectional laminates. The crossply laminates form the upper and lower sidewall regions and end portions thereof extend into the forward and aft conic regions to form a staggered distribution of structural joints and slip plane interfaces therein. The crossply laminates are comprised of high modulus fibers which are oriented within a range of ±42° to about ±38° relative to the longitudinal axis of the composite spar. The unidirectional laminates form the upper and lower sidewall regions and have end portions extending into the transition subregions. The unidirectional laminates are interposed between the crossply laminates and comprised of a mix of high and low modulus fibers which are oriented substantially parallel to the longitudinal axis. Furthermore, plies of reinforce fabric having low modules fibers oriented above about 80° relative to the longitudinal axis may be disposed between the unidirectional plies of the unidirectional laminate. The composite spar is manufactured in molds.

24 Claims, 11 Drawing Sheets

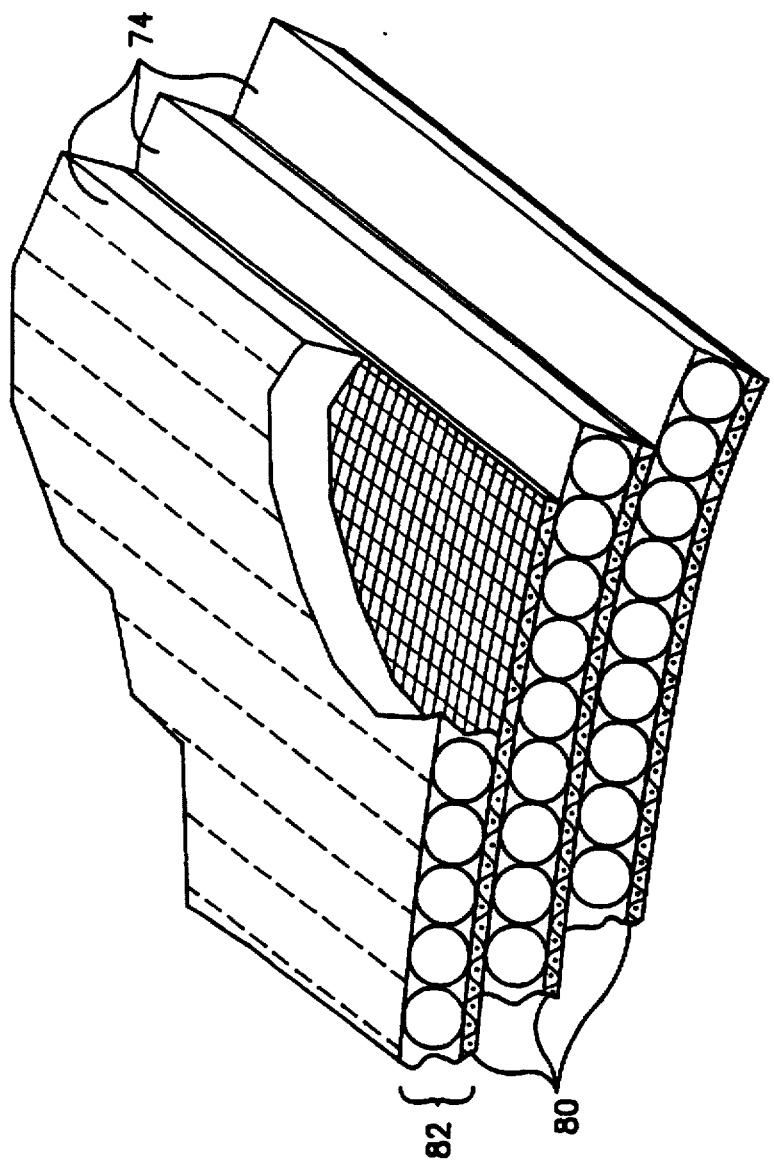

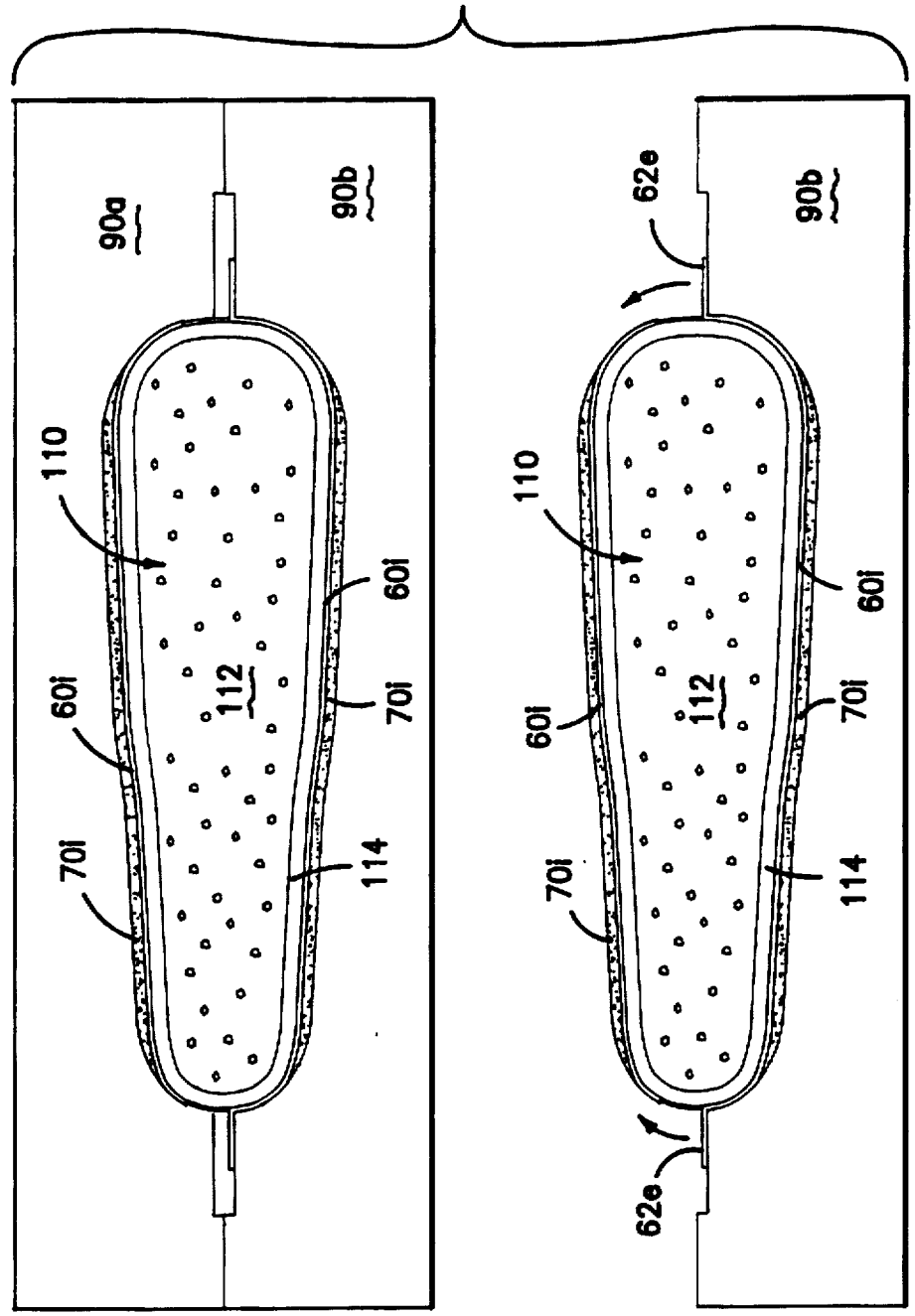

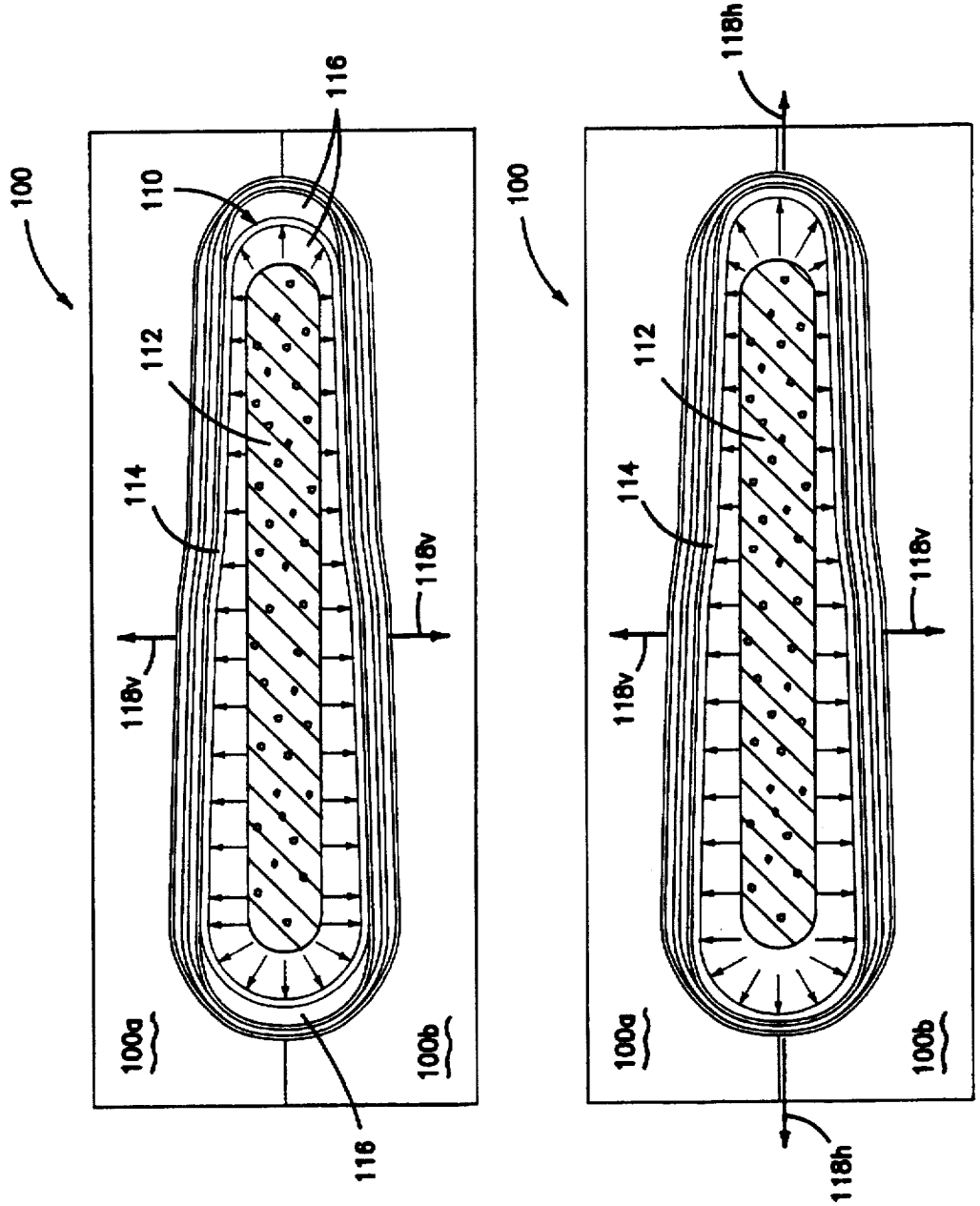

FIBER REINFORCED COMPOSITE SPAR FOR A ROTARY WING AIRCRAFT AND METHOD OF MANUFACTURE THEREOF

TECHNICAL FIELD

The present invention relates to fiber reinforced resin matrix composites, and more particularly, to an improved composite spar for a rotary wing aircraft having enhanced structural properties and improved damage tolerance with minimal weight, and a method for facilitating the manufacture thereof.

BACKGROUND OF THE INVENTION

A rotor blade spar is the foremost structural element of a helicopter rotor blade assembly inasmuch as its primary function is to transfer combined flapwise, edgewise, torsional and centrifugal loads to/from a central torque drive hub member. Typically, a leading edge sheath and trailing edge pocket assembly mount to and envelop the spar thereby yielding the desired airfoil contour. The spar typically extends the full length of the rotor blade and mounts at its inboard end to a cuff assembly or fitting which facilitates mounting to the hub member. Due to the extreme operational loading environment of the rotor blade, high strength, high density materials such as aluminum or titanium have, in the past, been the materials of choice for spar construction.

More recently, however, fiber reinforced resin matrix composite materials, e.g., graphite and fiberglass, have been employed due to their advantageous strength to weight ratio and improved damage tolerance. Regarding the latter, the structural fibers of composite materials can be viewed as a plurality of redundant load paths wherein damage to one or more fibers can be mitigated by the load carrying capability of adjacent fibers.

Despite the inherent weight and strength advantages of advanced composites, the widespread use thereof has been impeded by the high cost of associated fabrication methods. Blending the desired structural characteristics with a low cost manufacturing process, i.e., one which reduces labor intensive process steps yet maintains laminate quality, has been an ongoing and continuous challenge for designers of composite structures.

Primary structural items to be considered by the designer include: the selection of fiber reinforcement, i.e., materials having the requisite mechanical properties, resin binder, fiber matrix orientation, fiber continuity, alleviation of stress concentrations due to ply drop-offs or joint configurations, and reduction of thermally induced stresses. To maximize the benefits of composites it is essential that fiber orientation be optimally tailored to meet the strength and stiffness requirements for a particular application. That is, composites can be tailored to be anisotropic (capable of carrying load in a particular direction) rather than quasisotropic (equal strength in all directions); hence, orienting the fibers in the direction of the load will optimally result in the most weight efficient solution. Similarly, by varying the use of available matrix reinforcement materials (e.g., graphite, fiberglass, aramid fibers), the designer is able to control such parameters as vibratory and steady bending strength, stiffness, and toughness. In addition to the selection of materials and/or optimum fiber orientation, the continuity or discontinuity of fibers, and methods of joining discontinuous plies will significantly impact component strength. Generally, it is desirable to maintain fiber continuity and stagger joints so as to prevent stress concentrations and/or the build-up thereof in a particular region. Still other considerations relate to the thermal induced stresses which may result in microcracking. Microcracking is a phenomena wherein thermally induced stresses cause small cracks to develop in the binder material due to the thermal incompatibility of adjacent composite material. Generally, it is preferable to use the same material throughout the laminate or materials of similar thermal coefficient to reduce this effect.

These considerations are weighed and balanced against the cost and complexity of a particular fabrication technique. Typically, the manufacturing approach should: minimize cutting operations and material scrap, facilitate ease of handling, minimize the probability of operator/laminator error, be repeatable, accommodate fiber bulk variations, maintain uniform fiber volume, provide uniform laminate quality (via uniform compaction), and yield a mass-balanced lay-up, i.e., properly distribute the weight of the composite article.

Conventional methods for manufacturing composite spars include filament winding and prepreg lay-up of composite material. The filament winding process involves the winding of high strength filaments disposed in a matrix of binder material about a mandrel assembly of a shape generally corresponding to the required shape of the finished article. The mandrel assembly typically comprises a rigid substructure to support the wound matrix and an impervious bladder or bag disposed over the rigid substructure. In the case of the manufacture of an elongated article, such as a rotor blade spar, the filaments are wound over the mandrel, and the mandrel and filaments are reciprocally displaced relative to one another along the longitudinal or winding axis of the mandrel to build a plurality of layers of filamentary material. Upon completion of the filament winding process, the mandrel/wound lay-up is placed in a matched metal mold and cured. During the curing process the bladder is pressurized to urge the fibers against the mold surfaces of the matched metal mold.

Advantages of filament winding include continuity of fibers (i.e., the process requires no cutting or ply overlaps), ease of handling, and repeatability. A primary disadvantage to filament winding, however, relates to difficulties associated with expanding/urging the fibers against the mold surfaces of a matched metal mold. Since the fibers are initially wound about the mandrel under tension, it is difficult to force the elongation and/or shifting of fibers during bag pressurization, to achieve proper laminate compaction. Should the fibers resist complete and uniform compaction, the composite article may become resin-rich or resin-starved in particular areas resulting in poor laminate quality. In the case of an elliptically shaped composite article, the conic regions, i.e., corresponding to the leading and trailing edges of the rotor blade, will be most vulnerable to unacceptable variations in fiber volume.

Another disadvantage to filament winding relates to the difficulty associated with establishing fiber orientations at or near 0° relative to the longitudinal or winding axis of the mandrel assembly. Insofar as filament winding apparatus are deficient in this regard, it is common practice to periodically interrupt the winding operation to interleave unidirectional i.e., 0°, fibers.

Reavely et al., U.S. Pat. No. 4,621,980, describes an improved structural rotor blade spar manufactured via a filament winding process. Reavely teaches a multi-layered filament wound composite spar incorporating graphite fiber layers having a fiber orientation below about ±35° relative to the longitudinal axis and polyaramide fibers oriented below about ±15°. Such orientations provide a combination of axial and torsional stiffness while enabling the use of a filament winding process. That is, low orientation angles are used to achieve the desired axial stiffness inasmuch as filament winding is not amenable to laying fibers at or near 0° relative to the longitudinal axis. The process, therefore, provides a lay-up which compromises the desired fiber orientation, i.e., at or near 0°, to enable the implementation of a filament winding or automated manufacturing process.

The prepreg lay-up technique employs the use of discrete plies or laminates of pre-impregnated composite fabric, which are hand-stacked and interleaved over an inflatable mandrel assembly. The mandrel assembly is placed in a matched metal mold and cured in an autoclave oven for application of heat and pressure. When molding an elliptically shaped article, the lay-up will typically incorporate "slip-planes" located at the interface between overlapping composite plies. These regions of overlap permit the composite lay-up to expand (via slippage across the interface) during the compaction and cure of the composite article. Advantages to the use of a pre-impregnated composite material include ease of compaction, uniform laminate quality, minimal investment for capital equipment, and the ability to selectively orient and build-up material in particular regions. Disadvantages include high labor costs due to the laborious hand lay-up process, comparatively higher probability of operator error (e.g., the laminator may inadvertently omit a ply in a multi-ply laminate), and discontinuity of fibers within the laminate.

Salkind et al. U.S. Pat. No. 3,782,856 teaches a twin beam composite rotor spar having a plurality of high tensile strength fibers in a suitable binding matrix. The fibers include off-axis and unidirectionally oriented fibers which are combined to provide high torsional and axial stiffness. High modulus graphite fibers oriented at ±45° relative to the longitudinal axis are employed for maximum torsional stiffness. Low modulus fiberglass fibers oriented at 0°, i.e., along the longitudinal axis, are incorporated for maximum axial stiffness. Insofar as Salkind intersperses these laminates, and/or bonds packs of off-axis fibers to packs of unidirectional fibers, microcracking will result which adversely affects laminate strength. Furthermore such interspersion of alternating layers of material (one graphite, one fiberglass etc.) is highly labor intensive and prone to operator error.

U.K. Patent Application 2,040,790 discloses a method for manufacturing a constant width composite spar including the steps of: wrapping layers of pre-cut composite fabric about an inflatable mandrel assembly, and forming overlap joints in the upper and lower wall regions of the composite spar, i.e., corresponding to the upper and lower airfoil surfaces of the rotor blade. The overlap joints provide slip plane surfaces to facilitate compaction of the composite material during curing operations. Disadvantages to forming overlap joints in the upper and lower walls relates to trapping or pinching the composite fabric upon inflation of the mandrel. Should the inflatable mandrel trap the composite fabric, the slip planes are unable to perform their desired function thereby resulting in poor laminate compaction. This location is also undesirable since the upper and lower wall regions are exposed to high flapwise bending stress which results in the superimposition of stresses induced by the joint interface (i.e., stress concentrations).

Kamov, U.S. Pat. No. 3,967,996, and U.K. Patent Applications GB 2040790A and GB 2148 821 are other examples of pre-preg lay-up processes for manufacturing composite spars.

A need, therefore, exists to provide a composite spar structure which optimally blends the desired structural characteristics with a fabrication process which facilitates low cost manufacture. More specifically, a need exists to produce a structurally efficient composite spar which obviates the effects of microcracking, minimizes thermal strain, minimizes weight, and provides damage tolerance. Furthermore, there exists a need to provide a manufacturing process which permits uniform composite material compaction, ease of material handling, reduced hands-on labor during assembly, and produces a composite spar having improved mass distribution properties.

DISCLOSURE OF THE INVENTION

It is an object of the present invention to provide a composite spar structure having optimal fiber orientation for enhanced torsional and axial strength with the attendant benefits of reduced weight.

It is another object of the invention to provide a composite spar which obviates the adverse effects of microcracking.

It is yet another object of the invention to provide a composite spar having improved thermal strain properties.

It is yet a further object of the invention to provide a method for manufacturing such composite spar which facilitates uniform laminate compaction and provides improved laminate quality.

It is still another object of the invention to provide such a manufacturing method which reduces the amount of fiber cutting required to reduce the per part fabrication costs.

It is still another object of the present invention to provide such manufacturing method which incorporates constant width prepreg material to facilitate automated and/or manual lay-up thereof.

It is still a further object of the present invention to provide such manufacturing method which provides improved mass distribution along the longitudinal length of the composite spar.

According to the invention a composite spar is segregated into regions and subregions wherein fiber reinforced resin matrix composite laminates are selectively arranged and the material properties thereof selectively chosen. The composite spar includes crossply laminates in each of the upper and lower wall regions having end portions extending into the forward and aft conic regions, respectively. The end portions of the crossply laminates in the upper wall region overlap the end portions of the crossply laminates in the lower wall region to form structural joints in the forward and aft conic regions. The structural joints are operative to integrate the crossply laminates of the upper and lower wall regions.

The crossply laminates include high modulus composite fibers in a binding matrix, which crossply fibers are oriented within a range of ±38° to ±42° relative to the longitudinal axis of the composite spar. The composite spar also includes at least one unidirectional laminate in each of the upper and lower wall regions interposed between the crossply laminates. Each unidirectional laminate includes a combination of high and low modulus composite fibers in a binding matrix, which unidirectional fibers are oriented substantially parallel to the longitudinal axis. The structural joints are located in a region of low bending stress relative to the flapwise bending axis and the unidirectional laminates are located in a region of high bending stress relative to the flapwise bending axis for providing maximum bending strength. The crossply laminates provide combined torsional and axial strength relative to the flapwise bending and longitudinal axes, and the fiber orientation thereof provides thermal compatibility with adjacent unidirectional laminates. The low modulus composite fibers of the unidirectional laminates also provide enhanced damage tolerance.

A method of fabricating the composite is also disclosed which includes forming two molds, each of the molds including complementary mold halves having mold surfaces defining the upper wall and lower wall regions and the forward and aft conic regions. The mold surfaces are of progressively larger dimensions from an innermost to an outermost mold and the mold surfaces of the outermost mold define the outer mold line contour of the composite spar. Next, crossply and unidirectional laminates are laid in the molds, wherein the crossply laminates are laid in the upper and lower wall regions and have end portions extending into the forward and aft conic regions. The end portions furthermore extend beyond one of the mold surfaces associated with one of the complementary mold halves in each mold to facilitate the formation of structural joints and slip planes in the forward and aft conic regions. The unidirectional laminates are laid in the upper and lower wall regions of the complementary molds. The laminates are then assembled over an inflatable mandrel assembly to form a preform assembly having the unidirectional laminates interposed between the crossply laminates. The assembly steps include: sequentially placing the inflatable mandrel assembly into the complementary mold halves of the molds, and joining the end portions of the crossply laminates to form structural joints and slip planes in the forward and aft conic regions. The outermost mold is then closed over the preform assembly and the inflatable internal mandrel is pressurized for urging and compacting the laminates against the mold surfaces of the outermost mold. The outermost mold is then placed in an autoclave oven for curing the laminates under heat and pressure. The method forms structural joints and slip planes in the conic regions to facilitate uniform compaction of the ply laminates.

The foregoing and other objects, features and advantages of the present invention will become more apparent in light of the following detailed description of exemplary embodiments thereof, as illustrated in the accompanying drawings.

BRIEF DESCRIPTION OF THE DRAWINGS

A more complete understanding of the present invention and the attendant features and advantages thereof may be had by reference to the following detailed description of the invention when considered in conjunction with the following drawings wherein:

FIG. 6 is an exploded view of the composite lay-up of FIG. 3 showing plies of reinforcing fabric within the unidirectional laminate;

FIGS. 7a through 7e show the assembly of the composite rotor spar using molds for lay-up of the crossply and unidirectional laminates;

FIGS. 9a and 9b depict the use of an inflatable mandrel to form the composite spar of the present invention;

BEST MODE FOR CARRYING OUT THE INVENTION

Figure 1:
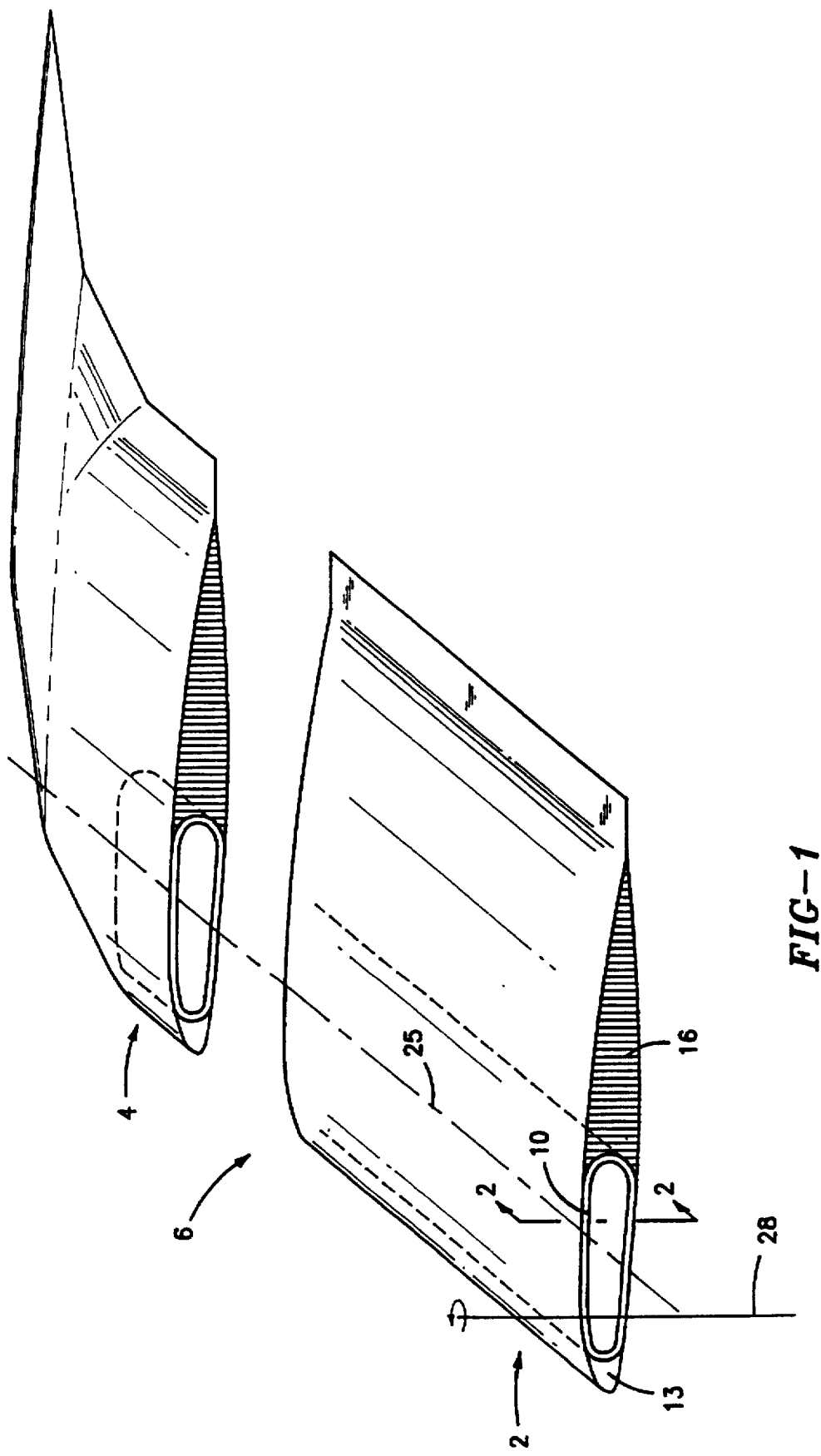
FIG. 1 is a partial perspective view of inboard and outboard segments of a composite rotor blade assembly including the composite rotor spar of the present invention.

Referring now to the drawings wherein like reference characters identify corresponding or similar elements throughout the several views, FIG. 1 shows a partial perspective view of the root and tip end portions 2 and 4, respectively, of a helicopter rotor blade assembly 6 having an elliptically shaped composite spar 10 disposed between a leading edge sheath assembly 1 3 and trailing edge pocket assembly 16. The composite spar 10 extends from the root end portion 2 to the tip end portion 4 along a longitudinal axis 25, and transfers all rotor blade loads to/from a central torque drive hub member (not shown). Also shown is the rotor shaft axis 28 about which the rotor blade assembly 6 is driven.

Figure 2:
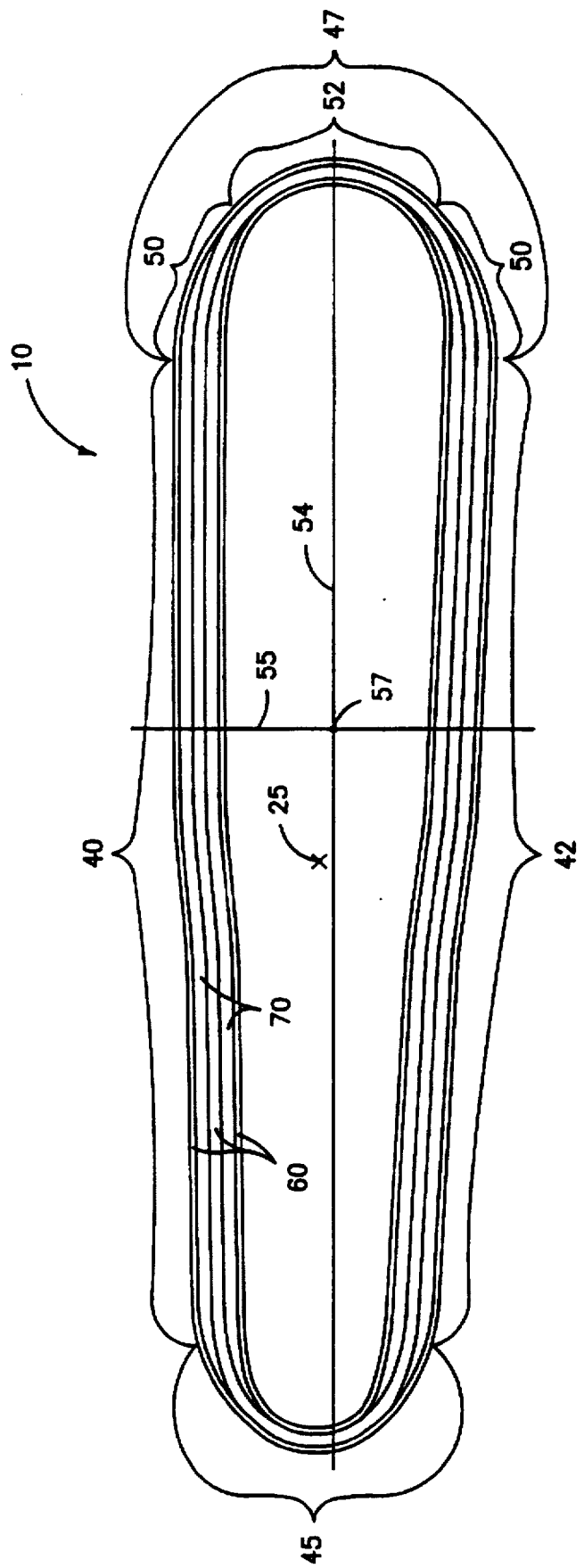
FIG. 2 is a cross-sectional view of the composite spar taken along line 2—2 of FIG. 1.

For the purposes of discussion the composite spar 10 is segregated into regions and subregions wherein the composite material used in the construction is selectively arranged and material properties selectively chosen to achieve the foregoing objectives. FIG. 2 depicts an inboard, or root end, cross-section along line 2—2 of FIG. 1. wherein the composite spar 10 is shown to include upper and lower wall regions 40 and 42, respectively, corresponding to upper and lower airfoil surfaces of the rotor blade assembly 6, and forward and aft conic regions 45 and 47, respectively, corresponding to the rotor blade leading and trailing edges. The conic regions 45, 47 also define transition and closure subregions 50 and 52, respectively, wherein the properties of the composite material are altered, e.g., thickness, material composition etc., from those in the wall regions 40, 42. The forward and aft conic regions 45, 47 connect the upper and lower wall regions 40, 42 thus forming a box structure for reacting vertical shear loads. Also shown are the flapwise and edgewise neutral bending axes 54 and 55 respectively, associated with the rotor blade assembly 6. The flapwise bending axis 54 extends chordwise along the composite spar 10 and the edgewise bending axis 55 is vertically oriented, which flapwise and chordwise bending axes 54, 55 intersect the centroid 57 of the rotor blade assembly 6. The flapwise and edgewise bending axes 54, 55 each represent the locus of points wherein bending stresses reverse orientation (e.g., from compressive to tensile stress and vice versa) and are consequently neutralized or nulled. While the axes 54, 55 represent lines of zero bending stress, points displaced therefrom are exposed to increasingly larger compressive or tensile bending stresses.

As will be apparent in the detailed discussion which follows, the orientation, location and material selection is critical to providing structural and weight efficiency while furthermore facilitating ease of manufacture. In the preferred embodiment of the invention, the composite spar 10 is comprised of a plurality of individual crossplies, unidirectional plies and plies of reinforcing fabric which are selectively arranged in the aforementioned regions and subregions. The crossplies are combined to form crossply laminates 60, and the unidirectional plies are combined to form unidirectional laminates 70. The crossply laminates 60 are located in the upper and lower wall regions 40, 42 and extend into the forward and aft conic regions 45, 47. The unidirectional laminates 70 are located in the upper and lower wall regions 40, 42 and transition subregions 50 of the forward and aft conic regions 45, 47.

Figure 3:
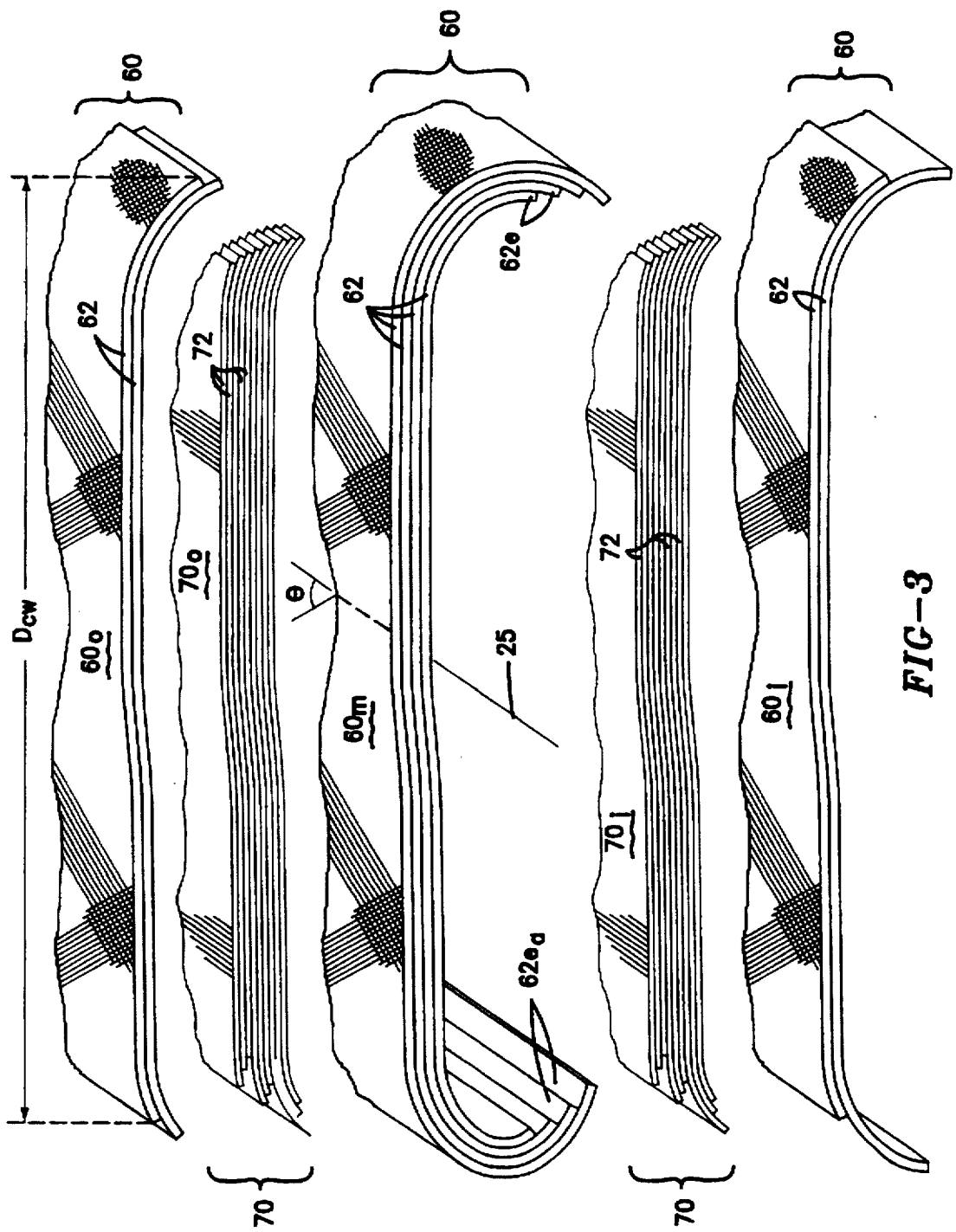
FIG. 3 is an exploded view of the composite lay-up used in construction of the composite spar of FIG. 2 showing the fiber orientation and arrangement of various crossply and unidirectional laminates employed therein.

FIG. 3 is an exploded view of the upper half of the composite plies employed in the construction of the composite spar 10, and shows with greater clarity, the size, fiber orientation, and arrangement of the plies. The lower half is omitted inasmuch as the ply construction is essentially identical to that of the upper half. While the reference numerals associated with the composite plies of the upper half are the same as the those in the lower half, occasionally the plies in the upper and lower half are designated with a subscript, "a" and "b", respectively, to impart a more complete understanding of the invention. A plurality of resin impregnated fiber reinforced crossplies are arranged in paired relation to form individual crossply pairs 62. That is, one crossply having fibers oriented in a +θ direction is paired with another having fibers oriented in a –θ direction relative to the longitudinal axis 25. The coupling or pairing of crossplies aids in material handling i.e., without separation or unraveling of fibers. For ease of understanding, crossply pairs will, hereinafter, be referred to as "a crossply" or "the crossplies", insofar as such materials are typically purchased from suppliers as integrated sheets of paired material. The crossplies 62 are composed of high modulus fibers such as graphite fibers in a binding matrix. These fibers generally have a tensile strength of about $3.45 \times 10^9$ N/m² (500,000 psi) to about $4.83 \times 10^9$ N/m² (700,000 psi), and a modulus of about $2.0676 \times 10^{11}$ N/m² ($30 \times 10^6$ psi) to about $3.446 \times 10^{11}$ N/m² ($50 \times 10^6$ psi), and preferably about $2.7568 \times 10^{11}$ N/m² ($40 \times 10^6$ psi). These fibers may range in cross-section from about 6.35 μm (0.00025 inch) to about 7.62 μm (0.00030 inch). The crossply fibers have a predetermined fiber orientation angle θ, which are preferably oriented within a range of about ±38° to about ±42°, and most preferably about ±40° relative to the longitudinal axis 25 of the composite spar 10.

The crossplies 62 have a chordwise width dimension Dcw, which varies from ply to ply, thereby resulting in end portions $62e_a$ which extend beyond, or, alternatively, terminate before an adjacent crossply. Each crossply 62, however, is constant in chordwise width dimension along the longitudinal axis 25 of the composite spar 10, i.e., from the rotor blade root end 2 to the tip end 4.

The crossplies 62 are stacked and arranged to form the crossply laminates 60. In the preferred embodiment, three crossply laminates are shown, i.e., innermost, outermost and intermediate crossply laminates 60i, 60o and 60m, respectively, however, it will become apparent that fewer or more crossply laminates can be employed.

A plurality of resin impregnated unidirectional plies 72 are stacked and arranged to form at least one unidirectional laminate 70 in each of the upper and lower wall regions 40, 42. Preferably, the plies 72 form two unidirectional laminates, i.e., an innermost and outermost unidirectional laminate 70i and 70o, respectively, interposed between the crossply laminates 60i, 60o, and 60m. The unidirectional plies 72 are composed of high and low modulus fibers such as graphite and fiberglass, respectively, in a binding matrix. The fiberglass fibers generally have a tensile strength of about $4.55 \times 10^{11}$ N/m² (660,000 psi), a modulus of about $6.892 \times 10^{10}$ N/m² ($10 \times 10^6$ psi) to about $9.48 \times 10^{10}$ N/m² ($14 \times 10^6$ psi), and preferably about $8.683 \times 10^{10}$ N/m² ($12.6 \times 10^6$ psi), and a cross section of about 8.89 μm (0.00035 inches). The graphite fibers are of the same strength, modulus and thickness as those employed in the above-described crossplies 62. The high and low modulus fibers are oriented substantially parallel i.e., less than 5°, and preferably 0°, relative to the longitudinal axis 25 of the composite spar 10.

Figure 4:
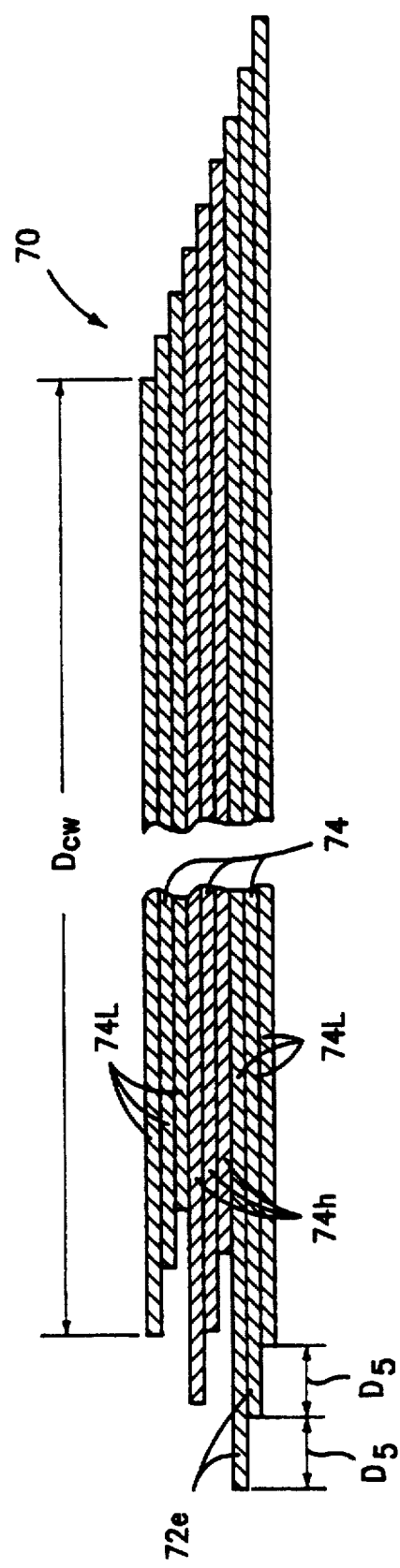
FIG. 4 shows an enlarged portion of the unidirectional laminate of FIG. 3 which more clearly shows the alternating layers of high and low modulus fibers.

Referring to FIG. 4, the unidirectional plies 72 of the unidirectional laminates 70i, 70o are combined or grouped to form alternating layers 74 of high and low modulus fiber reinforcement. Preferably, layers 74H having high modulus fiber reinforcement are disposed between layers 74L having low modulus fiber reinforcement. More preferably, the low modulus layers 74L are positioned adjacent the crossply laminates 60 which, as will be discussed in greater detail below, serves to produce a strain balanced laminate.

The unidirectional plies 72 are essentially of constant chordwise width dimension from ply to ply within each layer 74, but are staggered e.g., from right to left or visa versa, for displacing the end portions 72e thereof a distance Ds. Staggering the end portions 72e facilitates thickness transitions which occur within the finished composite spar 10. Such transitions are further accommodated by increasing the width dimension of the unidirectional plies 72 from layer to layer 74 within each unidirectional laminate 70. Similar to the crossplies 62, each unidirectional ply 72 is constant in chordwise width dimension along the longitudinal axis 25 of the composite spar 10.

The resin matrix material which is useful in producing these structures is epoxy resin, such as "8552" which is commercially available from Hercules Corporation. However, any number of epoxy resin systems may be used, such as "5225" which is commercially available from BASF.

Figure 5:
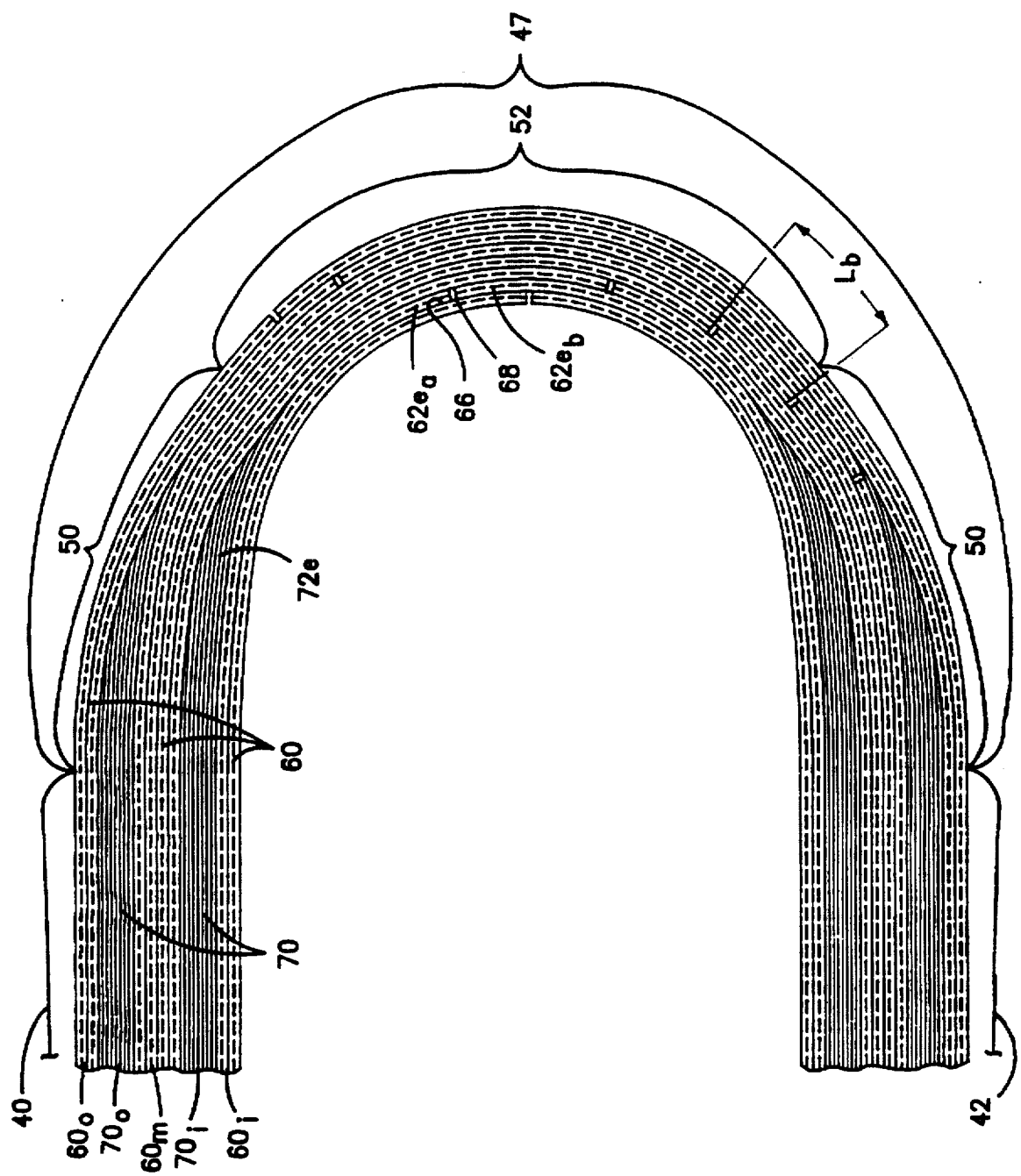
FIG. 5 is an enlarged cross-sectional view of the composite spar which shows the crossply and unidirectional laminates in various regions and subregions of the composite spar.

FIG. 5 shows an enlarged cross-sectional view of the right-hand (aft) portion of the composite spar 10 wherein the location and arrangement of the crossply laminates 60 and unidirectional laminates 70 are more clearly illustrated. The unidirectional laminates 70 are located in each of the upper and lower wall regions 40, 42 of the composite spar 10 and are interposed between crossply laminates 60. In the preferred embodiment, the unidirectional laminates 70 extend into the transition subregions 50 of the forward and aft conic regions 45, 47. The crossply laminates 60 are, therefore, spaced-apart in each of the upper and lower wall regions 40, 42, and gradually converge in the transition subregions 50. Full convergence of the crossply laminates 60 occurs in the closure subregion 52, wherein the end portions $62e_a$, $62e_b$ form a constant thickness of crossplies therein. It will be apparent, therefore, that the laminate thickness in the wall regions 40, 42 is greater than the laminate thickness in the closure subregions 52.

More specifically, and in accordance with the preferred description, the unidirectional laminates 70i, 70o, are interposed between the crossply laminates 60 thereby forming innermost, outermost and intermediate crossply laminates 60i, 60o, 60m, in each of the upper and lower wall regions 40, 42 and transition subregions 50. Furthermore, the staggered end portions 72e of the unidirectional laminates extend into and gradually drop-off in the transition subregions 50 of the conic regions 45, 47.

As alluded to earlier, the crossply laminates 60 have end portions $62e_a$, $62e_b$ which extend into the forward and aft conic regions 45, 47. The end portions $62e_a$ of the crossply laminates 60 forming the upper wall region 40 overlap with the end portions $62e_b$ of the crossply laminates 60 forming the lower wall region 42 to form slip plane interfaces 66 between adjacent crossplies 62 in the forward and aft conic regions 45, 47. Furthermore, the end portions 62$e_a$ 62$e_b$ form structural joints 68 in the conic regions 45, 47. The structural joints 68 are, preferably, butt joints which are staggered in the conic regions 45, 47 for preventing stress concentrations from mounting in a particular area. The peripheral length, Lb, between the butt joints 68 is between about 0.448 cm (0.175 inches) to about 0.832 cm (0.325 inches),.and preferably about 0.64 cm (0.25 inches).

Referring to FIG. 6, the unidirectional plies 72 of the unidirectional laminate are shown to include plies of reinforcing fabric 80 disposed between the unidirectional plies 72. The reinforcing fabric 80 is comprised of low modulus fiberglass material and includes fibers oriented above about ±80°, and preferably about 90°, relative to the longitudinal axis 25 of the composite spar 10. The fabric may either be unimpregnated, without binding matrix, or coupled with the unidirectional plies 72 as an impregnated pair 82. When used in an unimpregnated state, the flow of resin from adjacent plies will saturate the fabric during the curing process. The reinforcing fibers generally have a tensile strength of about $4.55\times10^{11}$ N/m$^2$ (660,000 psi), a modulus of about $6.892\times10^{10}$ N/m$^2$ ($10\times10^6$ psi) to about $9.48\times10^{10}$ N/m$^2$ ($14\times10^6$ psi), and preferably about $8.683\times10^{10}$ N/m$^2$ ($12.6\times10^6$ psi), and a cross section of about 8.89 µm (0.00035 inches).

Figure 7A:
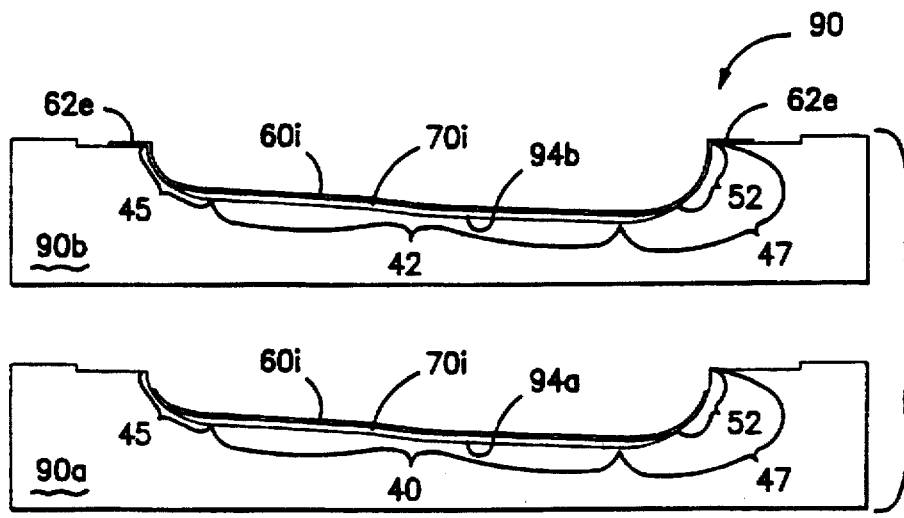

The composite spar 10 of the present invention may be assembled as illustrated in FIGS. 7a–7e. In the preferred description, innermost, outermost and intermediate molds 90, 95,100 are used to lay-up and form the composite spar 10. The molds have progressively larger dimensions i.e., outer mold line (OML), from the innermost to the outermost molds 90–100 to accommodate the progressive build-up of composite material. Referring to FIG. 7a, the innermost mold 90 includes complementary mold halves 90a and 90b which are used to lay-up innermost unidirectional laminates 70i and crossply laminates 60i. The mold halves 90a, 90b include mold surfaces 94a and 94b which define the upper and lower wall regions 40, 42 and forward and aft conic regions 45, 47. For ease of understanding, reference numerals corresponding to the regions and subregions of the composite spar 10 will also refer to the corresponding mold surfaces 94a, 94b of the complementary mold halves 90a, 90b.

In accordance with the preferred embodiment of the invention, the innermost unidirectional laminates 70i are first laid into the complementary mold halves 94a and 94b of the innermost mold 90. The unidirectional plies 72 which form each layer 74 of high and low modulus fiber reinforcement are staggered from ply to ply to facilitate thickness transitions occurring in the transition subregions 50. The width of the unidirectional plies 72 is selected such that the plies do not extend into the closure subregion 52 of the mold surfaces 94a, 94b. When incorporating plies of reinforcing fabric 80 into the lay-up, the unidirectional laminates 70 will include a plurality of impregnated ply pairs 82 (see FIG. 6), i.e., the unidirectional plies 72 and reinforcing fabric 80.

The innermost crossply laminates 60i are then laid over the innermost unidirectional laminates 70i so that the end portions 62e of the crossply laminates 60i extend into the forward and aft conic regions 45, 47 of the mold surfaces 94a, 94b. The end portions 62e of the crossply laminates 60i associated with one of the complementary mold halves 90a, 90b extend beyond the mold surfaces 94a, 94b to facilitate the formation of structural joints 68 and associated slip planes 66 in the forward and aft conic regions 45, 47. As mentioned earlier, the individual crossplies 62 are of select chordwise width dimension to stagger the end portions 62e thereof, thereby distributing the location of each structural joint 68. The crossply and unidirectional laminates 60i, 70i are of constant chordwise width along the longitudinal axis 25 of the spar 10 and require no cutting or darting of material.

Figure 7B:
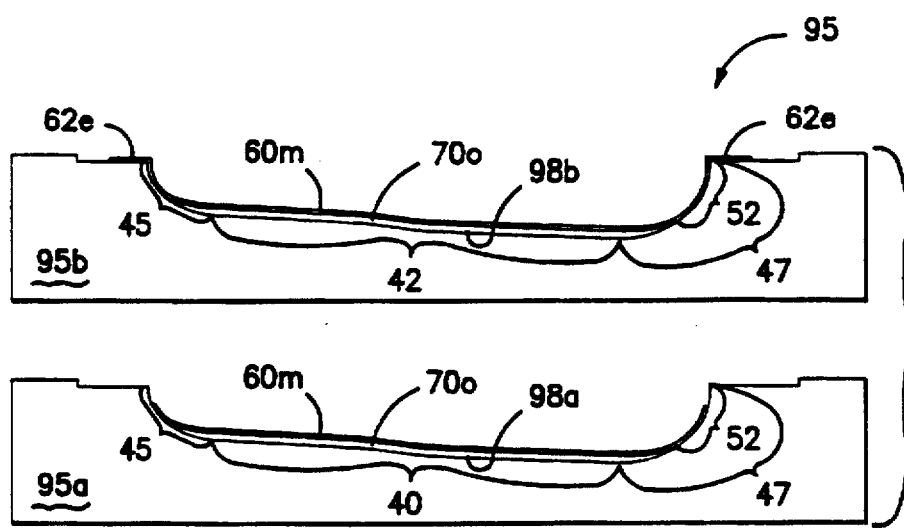

Referring to FIG. 7b, the intermediate crossply laminates 60m and outermost unidirectional laminates 70o are laid into complementary mold halves 95a, 95b of the intermediate mold 95 using the same lay-up procedure as that described above for the innermost mold 90. As mentioned earlier the mold surfaces 98a, 98b are slightly larger in OML dimension than that of the mold surfaces 94a, 94b to accommodate the build-up of composite material.

Figure 7C:
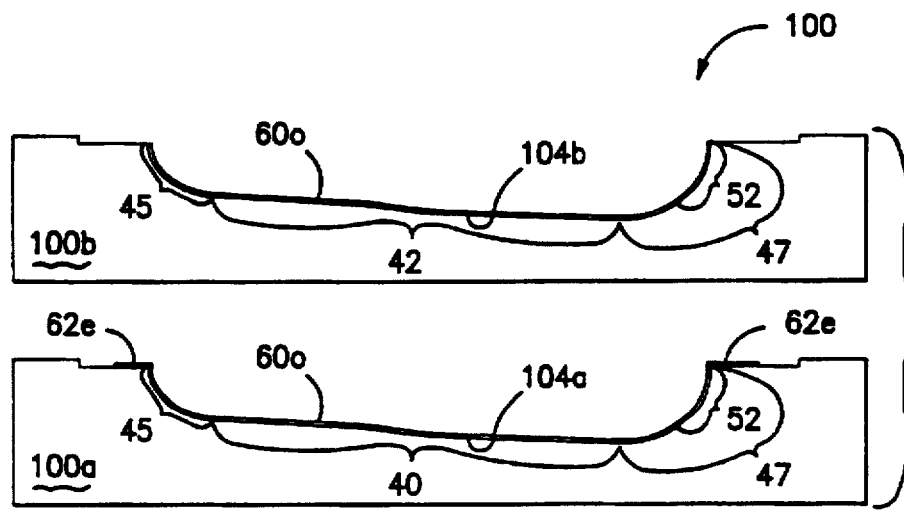

Referring to FIG. 7c, the outermost mold 100 having complementary mold halves 100a and 100b is used to lay-up the outermost crossply laminates 60o. The outermost mold 100 includes mold surfaces 104a and 104b which correspond to and define the outer mold line (OML) contour of the upper and lower wall and forward and aft conic regions 40, 42, 45, 47. The outermost crossply laminates 60o are laid into the complementary mold halves 100a, 100b of the outermost mold 100 so that the end portions 62e extend into the forward and aft conic regions 45, 47 of the mold surfaces 104a, 104b. Similar to the above described lay-up procedure for the innermost and intermediate molds 90, 95, the end portions 62e of the crossply laminates 60o associated with one of the complementary mold halves 100a, 100b extend beyond the mold surfaces 104a, 104b to facilitate the formation of the structural joints 68 and associated slip planes 66 in the forward and aft conic regions 45, 47. Again, the end portions 62e are staggered to facilitate the formation of and distribute the structural joints 68 in the conic regions 45, 47. The crossply laminates 60o are of constant chordwise width along the longitudinal axis 25 of the spar 10.

The crossply and unidirectional laminates 60, 70 which have been laid in the complementary mold halves of the innermost, intermediate and outermost mold 90, 95, 100 are then debulked using known debulking techniques. For example, an impervious nylon or silicon "vacuum bag" is placed over a complementary mold half, and the edges of the bag are taped or otherwise adhered thereto. A vacuum port is attached to the bag, and a vacuum is drawn in the cavity occupied by the laminates. When a vacuum is drawn, atmospheric pressure urges the bag against the laminates which partially consolidates the plies thereof.

Next, as shown in FIG. 7d, an inflatable internal mandrel assembly 110, the shape of which corresponds to the internal shape of the composite spar 10, is placed into the one of the complementary mold halves 90b of the innermost mold 90. The mandrel assembly 110 includes a rigid substructure 112 enveloped by an impervious bladder 114 which is pressurized during curing operations. While the substructure 112 may be composed of any rigid material, it is preferably composed of polystyrene which reduces in size in response to elevated temperatures. The other complementary mold half 90a of the same mold is placed over the internal mandrel assembly 110 for locating and placing the remaining innermost crossply and unidirectional laminates 60i, 70i over the mandrel assembly 110. To aid in material handling a release material or carrier film may be placed on the mold surfaces 94a, 94b and 98a, 98b prior to lay-up of the crossply and unidirectional laminates 60i, 70i, 60m, 70o, which material or film facilitates release thereof from the innermost and intermediate molds 90, 95. The mold is opened and the end portions 62e of the crossplies 72 are folded around the portion of the mandrel assembly which corresponds to the forward and aft conic regions 45, 47 of the composite spar 10, thereby joining the innermost crossply laminates 60i. To further improve adhesion in the conic sections 45, 47, a heat source may be applied to the end portions 62e when they are folded up and joined. The mandrel assembly 110, which includes the innermost crossply and unidirectional laminates 60i, 70i, is sequentially placed into one of the complementary mold halves of the remaining molds, i.e., intermediate or outermost, and the above procedure is repeated for mating the intermediate and outermost crossply laminates 60m, 60o as required.

Figure 7E:
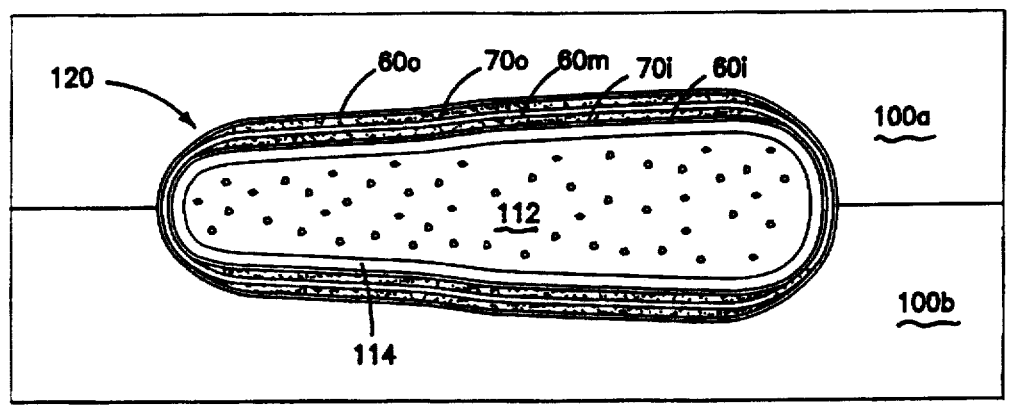

Referring to FIG. 7e, the assembly of laminates 60i, 70i, 60m, 70o, 60o from the innermost to outermost molds 90–100 results in a preform assembly 120 wherein the unidirectional laminates 70 are interposed between the crossply laminates 60. The outermost mold 100 is closed over the preform assembly 120 and placed in an autoclave oven for curing.

Compaction pressure is applied to the crossply and unidirectional laminates 60, 70 by pressurizing the impervious bladder 114 of the inflatable mandrel assembly 110. Pressurization urges and compacts the laminates 60, 70 against the mold surfaces 104a, 104b of the outermost mold 100. The entire assembly is then cured in a high temperature process, such as in an autoclave, to cure the composite spar 10. During the high temperature cure, the rigid substructure 112 shrinks to approximately 10% of its original size, thereby facilitating removal from the interior of the composite spar 10.

Having completed the description of the specific laminate construction, and the method steps for fabricating the composite spar 10, the following is a discussion of the structural and manufacturing advantages of the present invention.

Referring again to FIG. 2, the unidirectionally oriented fibers of the unidirectional laminates 70, located in the upper and lower wall regions 40, 42, are placed in a region of high flapwise bending stress for providing maximum flapwise bending strength. This placement of unidirectional fibers maximizes the distance from the flapwise bending neutral axis 54 for providing maximum flapwise bending strength and optimum structural efficiency. Unidirectional fibers are not employed in the conic regions 45,47 inasmuch as the close proximity to the flapwise bending axis 54, (a region of low flapwise bending stress), makes such fiber placement less effective. Conversely, the structural joints 68 are located in a region of low flapwise bending stress (i.e., in the forward and aft conic regions 45, 47) due to their close proximity to the flapwise bending axis 54. Such placement serves to prevent superimposition of stresses i.e., flapwise bending stresses and stress concentrations induced by the structural joints 68. While such location appears to place the structural joints 68 in a region of high edgewise bending stress, due to the distance offset from the edgewise bending axis 55, the stiffness contributions of the leading edge sheath and trailing edge pocket assemblies 13, 16 serve to mitigate edgewise bending stresses in the conic regions 45, 47. To alleviate stress still further, the structural joints 68 are staggered and distributed in the conic regions 45, 47.

The axially biased ±40° fiber orientation (i.e., biased in the direction of the longitudinal axis 25) of the crossply laminates 60 augments axial strength and stiffness throughout the composite spar 10 while concomitantly, providing torsional stiffness. This orientation of fibers produces the optimum combination of torsional and axial stiffness relative to the flapwise and longitudinal axes 54, 25 for providing maximum weight efficiency. Furthermore, the axial bias reduces thermally induced stresses, and consequently, the effects of microcracking. To better understand this phenomena, reference is made for FIG. 8a which shows a finite element of composite material 130 having upper and lower layers 132u and 132l of ±50° crossplies relative to the Y-axis of a reference coordinate system, and an intermediate layer 134 of 0° unidirectional plies. For the purposes of this discussion, no distinction is made between the material selection of the layers. The figure also shows the development of a severe strain profile 136 upon exposure to large temperature excursions such as upon autoclave curing. This is caused by a large disparity which exists between the coefficients of thermal expansion $\alpha_x$ of the crossplies 132u, 132l and the unidirectional plies 134. The $\alpha_x$ of the unidirectional material is dominated by the properties of the binding matrix, i.e., "resin dominated", such that the thermal expansion coefficient of such material is typically several orders of magnitude greater than that of the crossply material, i.e., "fiber dominated". Fiber dominated material is defined as a fiber matrix composite having fibers oriented above ±45° relative to the direction of thermal expansion. Hence, the ±50° fibers are fiber dominated inasmuch as fibers dominate or control the rate of thermal expansion along the X-axis. The severe strain distribution which develops can generate microcracks 138 in the laminate 130 and, consequently reduce overall laminate strength.

Figure 8A:
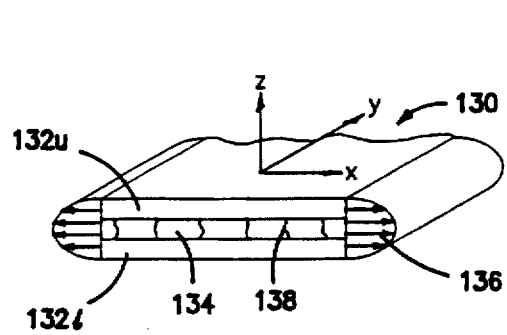
FIGS. 8a through 8e illustrate the thermal strain characteristics of a graphite and fiberglass fiber matrix composite and the effects on thermal strain when employing the teachings of the present invention.

To combat the effects of microcracking, the present invention employs crossply laminates 60 having a fiber orientation between about ±42° and ±38° relative to the longitudinal axis 25 of the composite spar 10 (analogous to the Y-axis in FIG. 8a). Such orientation results in a "resin dominated" matrix which more closely matches the thermal strain characteristics of the "resin dominated" unidirectional laminates 70. More specifically, the use of ±40° vs. ±45° crossply fiber orientation results in a 3 to 1 mismatch reduction between the thermal expansion of the crossply and unidirectional laminates 60, 70.

To further reduce microcracking, the composite spar 10 may employ reinforcing fabric 80 disposed between all layers 74 and preferably between all unidirectional plies 72. FIG. 8b shows an exploded view of a finite element of a composite article 140 employing the teachings of the present invention. The composite material includes ±40° crossply laminates 60, a multi-ply unidirectional laminate 70 having a 0° fiber orientation, and plies of reinforcing fabric 80 disposed therebetween. As mentioned earlier, the reinforcing fabric 80 employs low modulus fibers oriented above about 80°, and preferably about 90° relative to the longitudinal axis 25. The reinforcing fabric 80 serves to strengthen the binding matrix in the transverse direction (along the X-axis) and reduce the severity of thermal incompatibility between the laminates. Hence, the combination of reinforcing fabric 80 and reduced crossply fiber orientation, i.e., ±40° vs. ±45° or ±50° dramatically diminishes the severity of the thermal strain profile 146 (see FIG. 8c) for improved laminate strength.

In addition to preventing microcracking, the low modulus fibers of the reinforcing fabric 80 coupled with the low modulus layers 74L of the unidirectional laminates 70, provides superior damage tolerance. More specifically, during normal operation the low modulus fiberglass fibers (low modulus layers 74L) are loaded well below their strength capability while the high modulus graphite fibers are more highly loaded and react a dominant portion of the blade axial loads. Insofar as the low modulus fibers exhibit high elongation properties, i.e., the strain-to-failure ratio is approximately three times greater than that of the high modulus graphite fibers, the low modulus fibers are capable of absorbing high levels of impact energy before ultimate failure. Hence, in the event of an edgewise ballistic impact, the highly loaded graphite fibers will initially absorb the impact energy and, upon ultimate failure or damage thereto, the fiberglass fibers will ensue to absorb the remaining load without failure. Hence, the projectile energy will be absorbed and/or deflected so that ample fiber strength/content remains, i.e., 50% or more, to continue safe flight operations.

Whereas the previous discussion addressed the thermal properties in the transverse direction (along the X-axis), the following discussion is directed to the thermal strain characteristics in the longitudinal direction. Greater emphasis is placed on material selection and placement thereof for creating a homogeneous, strain-balanced lay-up. Microcracking is not prevalent in the longitudinal (Y-axis) direction inasmuch as the binding matrix is supported by reinforcing fibers.

Figure 8D:
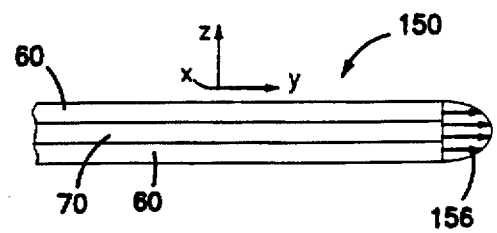
Figure 8E:
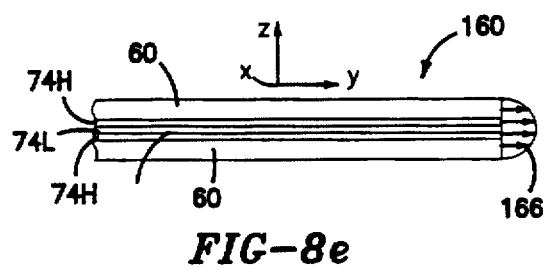
Figure 8B:
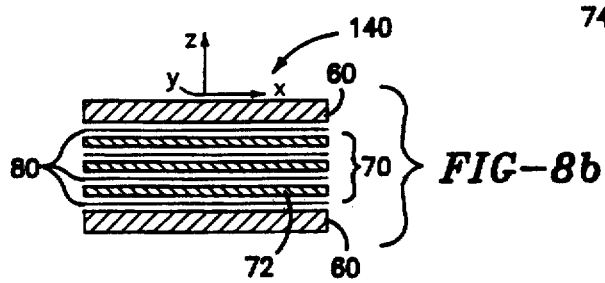
Figure 8C:
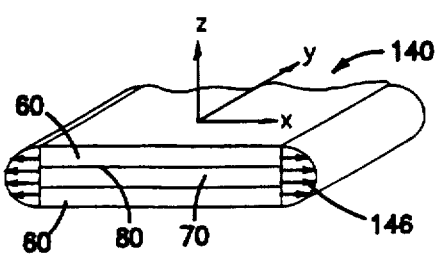

FIG. 8d shows an edge section (profile view) of a composite article 150 comprising ±40° upper and lower crossply laminates 60 and 0° unidirectional laminates 70 disposed therebetween. Upper and lower laminates 60 of crossply material are composed of high modulus graphite fibers and the unidirectional laminates are composed of a mix of high and low modulus graphite and fiberglass fibers. Inasmuch as the coefficient of thermal expansion $\alpha_y$ of the graphite crossply laminates 60 is significantly less than that of the graphite/fiberglass unidirectional laminates 70, a strain profile 156, similar to that shown is produced. A peculiarity, however, exists with graphite material in that the thermal coefficient of expansion associated with 0° fibers is nearly the same as that of the ±40° fibers. Accordingly, to reduce the strain profile, it is preferable to selectively place the graphite fibers within the unidirectional laminate. Referring to FIG. 8e, an edge section of a modified composite article 160 is shown having an intermediate layer 74H of high modulus graphite fibers interposed between layers 74L of low modulus fiberglass. The high modulus graphite serves to inhibit the thermal strain of the low modulus fiberglass on both sides thereof to reduce or flatten the strain profile 166. Such distribution of material, therefore, thus generates a strain-balanced laminate.

Referring now to the manufacturing advantages of the present invention, the placement and location of the structural joints 68 serves the dual purposes of providing structural efficiency and facilitating the fabrication process. The manufacturing benefits of such construction are best understood by referring to FIGS. 9a and 9b which show the inflatable internal mandrel assembly 110 in a partially inflated state within the outermost mold 100. The voids 116 between the impervious bladder 114 and the rigid substructure 112 and between the bladder and laminate are greatly exaggerated for illustration purposes. It will be apparent that an inflatable bladder will initially form a round or circular contour before taking on the elliptical shape of the composite spar 10. Accordingly, the bladder initially compacts the wall regions 40, 42 and of the spar 10 in the direction of the upper and lower vertical arrows 118v and, upon full pressurization thereof (see FIG. 9b), the bladder compacts the forward and aft conic regions 45, 47 in the direction of the fore and aft horizontal arrows 118h. Should structural joints, and associated slip planes, be located in areas other than in the conic regions, e.g., in the wall regions, the inflatable bladder will tend to trap or pinch the plies against the outermost mold surface and prevent slip plane movement. Accordingly, compaction of the laminates in the conic regions 45, 47 will be incomplete and deleteriously affect laminate quality.

The present invention places the joints 68 and associated slip planes 66 (between adjacent crossplies) in the conic regions 45, 47 for obviating the above mentioned difficulties and effecting complete compaction of the entire composite spar lay-up. It should also be noted that the mold surfaces for laying up the crossply and unidirectional laminates 60i, 70i, 60m, 70o, 60o are essentially net dimension i.e., as close as practicable to the final shape and location of the associated cured composite spar laminate(s). The relatively close tolerances held from lay-up to final cured dimensions require minimum displacement along the slip planes 66, thereby assuring complete and uniform laminate compaction.

The method of the present invention utilizes constant width crossply and unidirectional laminates 60, 70 which may be acquired pre-cut to size and laid without subsequent cutting or darting of material. The simplified lay-up procedure and tooling approach, i.e., using constant width, multi-ply laminates, avoids the complexities of the prior art associated with locating and cutting individual plies. This substantially reduces material waste and the hands-on labor required for assembly. Furthermore, the method of the present invention is amenable to automated lay-up. That is, each ply or laminate may be rolled and/or laid by automated machinery into a complementary mold half and subsequently de-bulked. Multi-axis composite lay-up and positioning machines such as those produced by Cincinnati Milicron are useful for automated lay-up of the type described.

Figure 10:
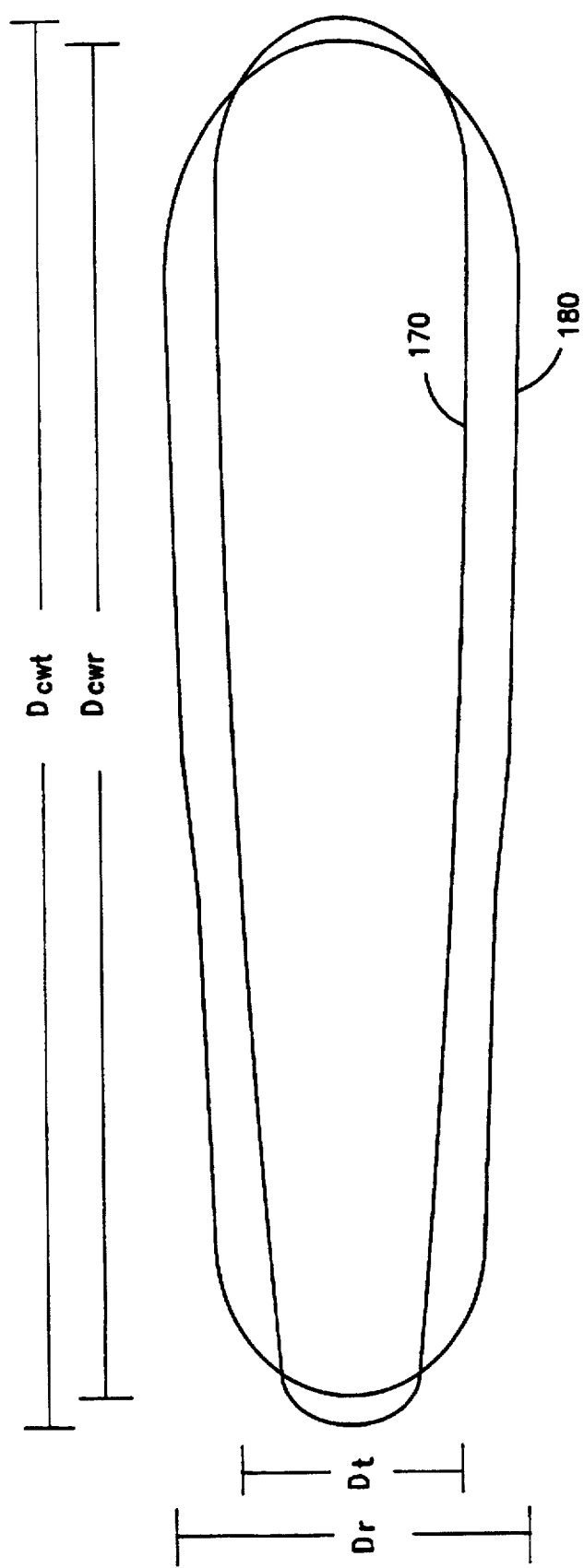
FIG. 10 shows the outer mold line contour of the composite spar at an inboard and outboard section thereof.

Referring to FIG. 10, OML contour profiles 170, 180 at the root and tip ends, respectively, of the composite spar 10 are overlaid for comparison purposes. The vertical thickness dimension, Dr and Dt, and chordwise width dimension Dcwr and Dcwt, are shown for the OML profiles 170 and 180, respectively. The thickness dimension, Dr and/or Dt, is generally established by the desired airfoil thickness contour of the rotor blade assembly 6.

Referring back to FIG. 1, it is typically desirable for a helicopter rotor blade to be greater in thickness at the root end 2 thereof than at the tip end 4 for generating greater lift in regions of low velocity airflow i.e., due to the smaller radial distance from the rotational axis 28 as compared to a larger radial distance to the tip end portion 4. Accordingly, it is common practice to taper a composite spar 10 structure in thickness and/or width dimension in accordance with airfoil contour changes, e.g., reducing thickness outboard to accommodate a thinner airfoil section. Such tapering is typically effected by cutting and/or darting of composite ply laminates. This method of construction, however, is highly labor intensive and induces additional stress concentrations within the laminate due to fiber discontinuity.

Coupled with the requirement for a thinner airfoil section at the rotor blade tip end 4, is the requirement to maintain rotor inertia for preventing a sudden decay in rotor speed due to large pilot command inputs, e.g., a large thrust/collective command input in an autorotation maneuver. It is common practice to append inertial weights to the rotor blade tip end 6 to augment rotor inertia. While this has not been problematic for heavy titanium and aluminum rotor blades of the prior art, the light weight attributes of composite construction are, in part, negated by the desire for inertial mass at the rotor blade tip end 6.

The method of the present invention addresses these seemingly unrelated design issues by the application of constant chordwise width crossplies and unidirectional plies 62, 72. The chordwise width dimension Dcw of each ply is predetermined and constant along the longitudinal axis 25 of the spar. It will be appreciated by examining the root and tip end profiles 170, 180 in FIG. 10, that the peripheral dimension of each, measured along the outer mold line contour of the composite spar 10, is essentially constant, i.e., within 5% of the other. This arises from the use of constant width plies 62, 72 wherein the reduction in thickness Dt at the tip end of the composite spar 10, results in a consequential increase in chordwise width dimension, Dcwt. The present invention, therefore restores rotor inertia at the rotor blade tip end by advantageously exploiting the increased chordwise width dimension of the composite spar 10 and the weight associated therewith.

The composite spar 10 of the described invention is comprised of sixteen graphite fiber matrix crossplies 62, and thirty-two graphite and fiberglass fiber matrix unidirectional plies 72, however, any number of composite plies may be employed depending on the loading requirements for a particular application. Although the invention is described as using graphite and fiberglass composite fibers, other composite fibers may be used which provide similar strength and modulus characteristics as the construction described herein. Furthermore, the preferred embodiment includes plies of reinforcing fabric 80 interspersed between all unidirectional plies 72, however, it will be apparent that such reinforcing fabric 80 may be eliminated depending upon the desired degree of spar strength and damage tolerance.

While the preferred embodiment describes a composite spar 10 having innermost, outermost and intermediate crossply laminates, 60i, 60o, 60m in the upper and lower wall regions 40, 42, and unidirectional laminates 70i, 70o, between the crossply laminates, it should be apparent that at few as two crossply laminates e.g., 60i and 60o, in each of the upper and lower wall regions 40, 42, respectively, and at least one unidirectional laminate, e.g., 70i, in each of the same regions, may be employed. It will be appreciated that more plies of composite material will be necessary in each of the laminates to bear the same applied loads. Furthermore, additional crossply and unidirectional laminates 60, 70 may be employed to further strengthen and balance the composite lay-up.

The preferred embodiment also describes a composite spar manufactured utilizing a plurality of molds, however it should be realized that as few as two, e.g. innermost and outermost molds 90, 100, or more than three may be used while remaining within the spirit and scope of the invention.

In summary, the present invention reduces microcracking, provides enhanced damage tolerance, optimally locates and orients the fiber reinforced material for maximum weight efficiency, and provides a strain balanced lay-up. Additionally, the method facilitates ease of manufacture, permits uniform laminate compaction, reduces hands on labor required during assembly, is repeatable and amenable to automated manufacture. Lastly, the method of construction yields an improved composite spar having an advantageous mass distribution along the longitudinal length thereof.

What is claimed is:

1. A composite spar (10) for a helicopter rotor blade (6), the composite spar being composed of composite laminates (60, 70) having a combination of high and low modulus composite fibers disposed in a binding matrix, the composite spar, furthermore, defining upper and lower wall regions (40, 42), forward and aft conic regions (45, 47), and flapwise bending and longitudinal axes (54, 25), the composite spar (10) being characterized by:

crossply laminates (60) in each of the upper and lower wall regions (40, 42) having end portions ($62e_a$, $62e_b$) extending into the forward and aft conic regions (45, 47), respectively, said end portions ($62e_a$) of said crossply laminates (60) in said upper wall region (40) overlaping said end portions ($62e_b$) of said crossply laminates (60) in said lower wall region (42) to form structural joints (68) in the forward and aft conic regions (45, 47), said structural joints operative to integrate said crossply laminates (60);

said crossply laminates having high modulus composite fibers being oriented within a range of ±42° to ±38° relative to the longitudinal axis (25); and, at least one unidirectional laminate (70) in each of the upper and lower wall regions (40, 42) interposed between said crossply laminates (60), said unidirectional laminate (70) including a combination of high and low modulus composite fibers being oriented substantially parallel to the longitudinal axis (25);

wherein said structural joints are located in a region of low bending stress relative to the flapwise bending axis (54) and said unidirectional laminate (70) is located in a region of high bending stress relative to the flapwise bending axis (54) for providing maximum bending strength;

wherein said crossply laminates (60) provide combined torsional and axial strength relative to the flapwise bending and longitudinal axes (54, 25), and said fiber orientation thereof provides thermal compatibility with an interposed unidirectional laminate (70);

wherein said low modulus composite fibers of said unidirectional laminate (70) provides enhanced damage tolerance.

2. The composite spar (10) according to claim 1 wherein the forward and aft conic regions (45, 47) furthermore define transition and closure subregions (50, 52) and wherein said unidirectional laminate (70) has end portions (72e) extending into said transition subregions (50).

3. The composite spar (10) according to claim 2 wherein said crossply laminates (60) form innermost, outermost and intermediate laminates (60i, 60o, 60m) in the upper and lower wall regions (40, 42) and said transition subregions (50).

4. The composite spar (10) according to claim 3 wherein said innermost, outermost and intermediate crossply laminates (60i, 60o, 60m) combine to form a constant thickness of high modulus fibers in said closure subregions (52).

5. The composite spar (10) according to claim 1 wherein said unidirectional laminate (70) comprises alternating layers of high and low modulus fiber reinforcement (74) and wherein at least one said layer of high modulus fiber reinforcement (74H) is disposed between said layers of low modulus (74L) reinforcement for providing enhanced thermal stress properties and damage tolerance.

6. The composite spar (10) according to claim 5 wherein said layers (74L) of low modulus reinforcement are positioned adjacent to said crossply laminates (60).

7. The composite spar (10) according to claim 2 wherein unidirectional laminate (70) has staggered end portions (72e) which extend into said transition subregions (50).

8. The composite spar (10) according to claim 1 wherein said crossply fibers are oriented above 40° relative to the longitudinal axis (25).

9. The composite spar (10) according to claim 1 wherein said structural joints (68) have a staggered distribution therein.

10. The composite spar (10) according to claim 1 wherein said fibers said unidirectional laminate (70) are composed of graphite and fiberglass material and wherein said fibers of said crossply laminates (60) are composed of graphite material.

11. The composite spar (10) according to claim 5 further comprising a ply of reinforcing fabric (80) disposed between said alternating layers of high and low modulus fiber reinforcement, each said ply of reinforcing fabric (80) having low modulus fibers oriented above 80° relative to the longitudinal axis (25).

12. The composite spar (10) according to claim 11 wherein each of said layers (74) comprise a plurality of unidirectional plies (72) and wherein a ply of reinforcing fabric (80) is interposed between said unidirectional plies (72).

13. The composite spar (10) according to claim 11 or 12 wherein fibers of said reinforcing fabric (80) are composed of fiberglass material.

14. A method for manufacturing a composite spar (10) for a helicopter rotor blade (6), the composite spar being composed of composite laminates (60, 70) having a combination of high and low modulus composite fibers disposed in a binding matrix, the composite spar (10), furthermore, having upper and lower wall regions (40, 42), forward and aft conic regions (45, 47) and a longitudinal axis (25), wherein the method is characterized by the steps of:

providing at least two molds (90, 100), each of the molds including complementary mold halves (90a, 90b, 101a, 100b) having mold surfaces (94a, 94b, 104a, 104b) defining the upper and lower wall regions (40, 42) and the forward and aft conic regions (45, 47), the mold surfaces (94a, 94b, 104a, 104b) being of progressively larger dimensions from an innermost mold (90) to an outermost mold (100), the outermost mold (100) defining the outer mold line contour of the composite spar 10);

laying-up crossply laminates (60) in each of the upper and lower wall regions (40, 42) of the molds, said crossply laminates (60) having end portions (62e) extending into the forward and aft conic regions (45, 47), the end portions (62e) furthermore extending beyond one of the mold surfaces associated with one of the complementary mold halves of each mold, the crossply laminates (60), furthermore, being composed of high modulus composite fibers, laying-up at least one unidirectional laminate (70) in each of the upper and lower wall regions (40, 42) of one of the molds, said unidirectional laminate (70) composed of a combination of high and low modulus composite fibers;

assembling the crossply and unidirectional laminates (60, 70) over an inflatable mandrel assembly (110) to form a preform assembly (120) having the unidirectional laminate (70) interposed between the crossply laminates (60) comprising the steps of:

sequentially placing the inflatable mandrel assembly (110) into the complimentary mold halves (90a, 90b, 100a, 100b) of the molds (90, 100); and joining the end portions 62e of the crossply laminates (60) to form structural joints (68) and slip planes (66) in the forward and aft conic regions (45, 47); closing the outermost mold (100) over the preform assembly (120);

pressurizing the inflatable mandrel assembly (110) for urging the crossply and unidirectional laminates (60, 70) against the mold surfaces (100a, 100b) of the outermost mold (100) to compact the laminates (60, 70); and, curing the crossply and unidirectional laminates (60, 70), whereby the forming of structural joints (68) and slip planes (66) in the conics regions (45, 47) facilitates uniform compaction of the crossply and unidirectional laminates (60, 70).

15. The method according to claim 14 further comprising the steps of:

providing an intermediate mold (95) including complementary mold halves (95a, 95b) having mold surfaces (98a, 98b) defining the upper and lower wall regions (40, 42) and the forward and aft conic regions (45, 47); and, laying-up crossply laminates (60) in upper and lower wall regions (40, 42) of the intermediate mold (95), the crossply laminates (60) having end portions (62e) extending into the forward and aft conic regions (45, 47), said end portions (62e) furthermore extending beyond one of the mold surfaces associated with one of the complementary mold halves.

16. The method according to claim 14 further comprising the steps of debulking the crossply and unidirectional laminates (60, 70) in the complementary mold halves (94a, 94b, 100a, 100b) prior to said step of assembling the laminates (60, 70) over the inflatable mandrel (110).

17. The method according to claim 14 further comprising the step of providing crossply laminates (60) having staggered end portions (62e), and wherein said step of joining the end portions (62e) to form structural joints (68) includes forming a staggered distribution thereof in the forward and aft conic regions (45, 47).

18. The method according to claim 14 wherein said step of laying-up the at least one unidirectional laminate (70) includes laying-up the unidirectional laminate (70) to form alternating layers (74) of high and low modulus fiber reinforcement and laying-up at least one layer (74H) of high modulus fiber reinforcement between layers (74L) of low modulus reinforcement.

19. The method according to claim 18 wherein said step of laying-up the at least one unidirectional laminate (70) includes laying-up the low modulus reinforcement layers (74L) adjacent to the crossply laminates (60) following said step of assembling the laminates (60, 70) over the inflatable mandrel assembly (110).

20. The method according to claim 14 wherein said step of laying-up the crossply and unidirectional laminates (60, 70) in the molds (90, 100) includes orienting the crossply fibers within a range of ±42° to ±38° relative to the longitudinal axis (25), and orienting the unidirectional fibers substantially parallel to the longitudinal axis (25).

21. The method according to claim 14 wherein said steps of laying-up the crossply laminates (60) in the molds (90, 100) orienting the crossply fibers above ±40° relative to the longitudinal axis (25).

22. The method according to claim 14 further comprising the step of combining plies of reinforcing fabric (80) with unidirectional plies (72) to form the unidirectional laminate (70) and the reinforcing fabric (80) including low modulus fibers in a binding matrix.

23. The method according to claim 22 wherein the step of laying-up plies of reinforcing fabric (80) includes orienting the reinforcing fibers above ±80° relative to the longitudinal axis (25).

24. A composite spar (10) for a helicopter rotor blade (6), the composite spar (10) having upper and lower wall regions (40, 42) connected by a forward and aft conic regions (45, 47), the composite spar (10) tapering in vertical thickness dimension along the longitudinal axis (25) thereof and having an outer mold line contour along which a peripheral dimension is measured, the composite spar (10) being characterized by:

- crossply laminates (60) in each of the upper and lower wall regions (40, 42) having end portions ($62e_a$, $62e_b$) extending into the forward and aft conic regions (45, 47), respectively, said end portions ($62e_a$) of said crossply laminates (60) in said upper wall region (40) overlaping said end portions ($62e_b$) of said crossply laminates (60) in said lower wall region (42) to form structural joints (68) in the forward and aft conic regions (45, 47), said structural joints operative to integrate said crossply laminates (60);

said crossply laminates (60) including a plurality of individual crossplies (62) having a constant chordwise width dimension along the longitudinal axis (25); and

- at least one unidirectional laminate (70) in each of the upper and lower wall regions (40, 42) interposed between said crossply laminates (60), said unidirectional laminate (70) including a plurality of individual unidirectional plies (72) having a constant chordwise width dimension along the longitudinal axis (25);

- said constant width dimension crossplies and unidirectional plies (62, 72) forming a constant peripheral dimension;

- whereby said constant peripheral dimension increases the inertial mass of the composite spar (10) at the tip end (4) thereof.

* * * * *